US011955725B2

(12) United States Patent
Jian et al.

(10) Patent No.: US 11,955,725 B2
(45) Date of Patent: Apr. 9, 2024

(54) ANTENNA STRUCTURE AND TERMINAL

(71) Applicant: VIVO MOBILE COMMUNICATION CO., LTD., Guangdong (CN)

(72) Inventors: Xianjing Jian, Dongguan (CN); HuanChu Huang, Dongguan (CN); Yijin Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 361 days.

(21) Appl. No.: 17/358,297

(22) Filed: Jun. 25, 2021

(65) Prior Publication Data

US 2021/0320411 A1 Oct. 14, 2021

Related U.S. Application Data

(63) Continuation of application No. PCT/CN2019/126190, filed on Dec. 18, 2019.

(30) Foreign Application Priority Data

Dec. 27, 2018 (CN) ........................ 201811616012.1

(51) Int. Cl.
*H01Q 5/357* (2015.01)
*H01Q 1/22* (2006.01)
(Continued)

(52) U.S. Cl.
CPC ........... *H01Q 5/357* (2015.01); *H01Q 1/2283* (2013.01); *H01Q 1/36* (2013.01); *H01Q 1/50* (2013.01); *H01Q 21/08* (2013.01); *H01Q 1/243* (2013.01)

(58) Field of Classification Search
CPC ........ H01Q 1/2283; H01Q 1/243; H01Q 1/36; H01Q 1/50; H01Q 1/523; H01Q 5/357; H01Q 9/27; H01Q 21/08
See application file for complete search history.

(56) References Cited

U.S. PATENT DOCUMENTS 4,403,221 A 9/1983 Lamberg et al.
9,974,165 B2 * 5/2018 Gouchi ................ H05K 3/4092
(Continued)

FOREIGN PATENT DOCUMENTS

CN 103247581 B * 10/2015 ....... G06K 19/07775
CN 108011184 A 5/2018
(Continued)

OTHER PUBLICATIONS

International Search Report and Written Opinion of the International Searching Authority regarding International Patent Application No. PCT/CN2019/126190, dated Mar. 18, 2020. Translation provided by Bohui Intellectual Property.
(Continued)

*Primary Examiner* — Raymond R Chai
(74) *Attorney, Agent, or Firm* — Harness, Dickey & Pierce, P.L.C.

(57) ABSTRACT

An antenna structure includes a metal plate and a spiral radiator. The metal plate is provided with a first surface and a second surface that are disposed oppositely. An accommodating groove is formed in the metal plate and adjacent to the first surface. The spiral radiator is mounted in the accommodating groove and insulated from the metal plate, and the spiral radiator is provided with a feed end used to be connected to a feed source.

13 Claims, 8 Drawing Sheets

(51) Int. Cl.

| | |
|---|---|
| ***H01Q 1/24*** | (2006.01) |
| ***H01Q 1/36*** | (2006.01) |
| ***H01Q 1/50*** | (2006.01) |
| ***H01Q 21/08*** | (2006.01) |

(56) References Cited

U.S. PATENT DOCUMENTS

| | | | | |
|---|---|---|---|---|
| 11,075,445 | B2 * | 7/2021 | Im | H01Q 1/38 |
| 11,467,343 | B2 * | 10/2022 | Peng | G02B 6/305 |
| 11,688,953 | B2 * | 6/2023 | Huang | H01Q 21/0031<br>343/702 |
| 2016/0351996 | A1 * | 12/2016 | Ou | H01Q 1/243 |
| 2018/0342795 | A1 | 11/2018 | Yoo | |
| 2019/0115643 | A1 * | 4/2019 | Khan | H01Q 9/42 |
| 2019/0305405 | A1 * | 10/2019 | Im | H01Q 1/243 |
| 2020/0161766 | A1 * | 5/2020 | Liu | H01Q 9/045 |

FOREIGN PATENT DOCUMENTS

| | | | | |
|---|---|---|---|---|
| CN | 108400424 | A | 8/2018 | |
| CN | 108695596 | A | 10/2018 | |
| CN | 108933331 | A | 12/2018 | |
| CN | 108963426 | A | 12/2018 | |
| CN | 109066055 | A | 12/2018 | |
| CN | 109088181 | A * | 12/2018 | H01L 23/66 |
| CN | 109728413 | A | 5/2019 | |
| WO | WO-2017167987 | A1 | 10/2017 | |

OTHER PUBLICATIONS

First Office Action regarding Chinese Patent Application No. 201811616012.1, dated Feb. 21, 2020. Translation provided by Bohui Intellectual Property.

Second Office Action regarding Chinese Patent Application No. 201811616012.1, dated Jul. 16, 2020. Translation provided by Bohui Intellectual Property.

Supplementary European Search Report regarding Patent Application No. 19904353.0-1205/3905435; PCT/CN2019/126190, dated Jan. 19, 2022.

"Compact LTCC Antenna Package for 60 GHz Wireless Transmission of Uncompressed Video," S. Brebels, et al., Microwave Symposium Digest (MTT), IEEE, 2011.

* cited by examiner

ANTENNA STRUCTURE AND TERMINAL

CROSS-REFERENCE TO RELATED APPLICATIONS

This application is a Bypass Continuation Application of PCT/CN2019/126190 filed on Dec. 18, 2019, which claims priority to Chinese Patent Application No. 201811616012.1 filed on Dec. 27, 2018, which are incorporated herein by reference in their entirety.

TECHNICAL FIELD

The present disclosure relates to the field of communications technologies, and in particular, to an antenna structure and a terminal.

BACKGROUND

The antenna in package (AiP) technology is mostly used for millimeter-wave antennas. In this technology, a millimeter-wave array antenna, a radio frequency integrated circuit (RFIC), and a power management integrated circuit (PMIC) are integrated into one module. Antenna elements that constitute a millimeter-wave array are mainly patch antennas, Yagi-Uda antennas, or dipole antennas. These antenna elements are relatively narrow-band antennas. For example, the relative bandwidth percentage of conventional patch antennas is generally not greater than 8%, while the millimeter-wave frequency band usually requires dual-frequency band or multi-frequency band and large bandwidth, which poses a great challenge to the antenna design.

SUMMARY

According to a first aspect, an embodiment of the present disclosure provides an antenna structure, including:

- a metal plate, where the metal plate is provided with a first surface and a second surface that are disposed oppositely, and an accommodating groove is formed in the metal plate and adjacent to the first surface; and
- a spiral radiator, where the spiral radiator is mounted in the accommodating groove and insulated from the metal plate, and the spiral radiator is provided with a feed end used to be connected to a feed source.

According to a second aspect, an embodiment of the present disclosure provides a terminal, including:

- an antenna structure, where the antenna structure is the antenna structure provided in the foregoing embodiment, and the metal plate is grounded; and
- a radio frequency module, where the radio frequency module is located on the second surface of the metal plate, and the radio frequency module is electrically connected to or coupled with the feed end of the spiral radiator.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

In order to meet the requirements for dual-frequency band, multi-frequency band, and multi-broadband, it is often necessary to form slots in radiation fins of patch antennas or adopt a laminated structure. However, in most cases, either dual-polarization of similar performance is difficult to achieve or the thickness of the millimeter-wave array antenna is increased by this method. As a result, more layout space on a mobile phone is occupied, which goes against the miniaturization or thinning of the mobile phones and overall design and integration of the mobile phones.

In addition, the space loss in the millimeter-wave band is high. Therefore, array antennas need to be adopted in the design of antennas in the millimeter-wave band to increase the antenna gain, compensate for high path loss, and expand the wireless coverage. Therefore, a high gain is also one of the important performance indexes for a millimeter-wave antenna array. However, a high-grain array requires not only increasing of antenna elements, but also design of high-gain antenna elements in the array.

Figure 5:
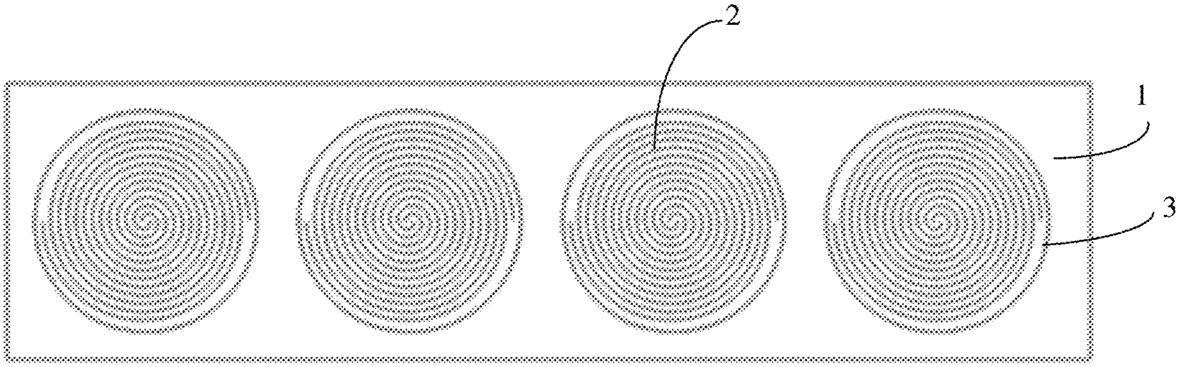
FIG. 5 is a schematic structural diagram of an antenna structure according to an embodiment of the present disclosure.

An embodiment of the present disclosure provides an antenna structure, shown in FIG. 5. The antenna structure includes:

a metal plate 1, where the metal plate 1 is provided with a first surface and a second surface that are disposed oppositely, and an accommodating groove 3 is formed in the metal plate 1 and adjacent to the first surface; and a spiral radiator 2, where the spiral radiator 2 is mounted in the accommodating groove 3 and insulated from the metal plate 1, and the spiral radiator 2 is provided with a feed end used to be connected to a feed source.

According to the antenna structure in this embodiment of the present disclosure, the accommodating groove 3 is formed in the metal plate 1, and the spiral radiator 2 is mounted in the accommodating groove 3, so that the characteristic that electricity properties of the spiral radiator 2 such as the pattern, antenna gain, and input impedance have little change within a relatively wide frequency range is utilized. Therefore, circular polarization is realized and any polarized incoming waves could be received to reduce the disconnection probability of wireless communication. In addition, to some extent, design problems such as multi-frequency band, large bandwidth, and high gain are resolved, the stability of wireless communication is improved, and the space occupied by the antenna structure is reduced. This facilitates miniaturization and overall integration.

Optionally, the spiral radiator 2 is a planar spiral radiator, that is, any structure constituting the spiral radiator 2 is in the same plane. For example, the spiral radiator 2 may be an Archimedean spiral radiator. Because the planar spiral radiator 2 has a symmetrical gradient structure, and electricity properties of the spiral radiator 2 such as the pattern, antenna gain, and input impedance have little change within a relatively wide frequency range, broadband coverage can be easily realized.

Optionally, the orthographic projection image of the spiral radiator 2 on the metal plate 1 is approximately round or square, and the accommodating groove 3 fits the spiral radiator 2. Therefore, the spiral radiator 2 can be processed and manufactured conveniently, and the spiral radiator 2 can be easily mounted in the accommodating groove 3.

Figure 1:
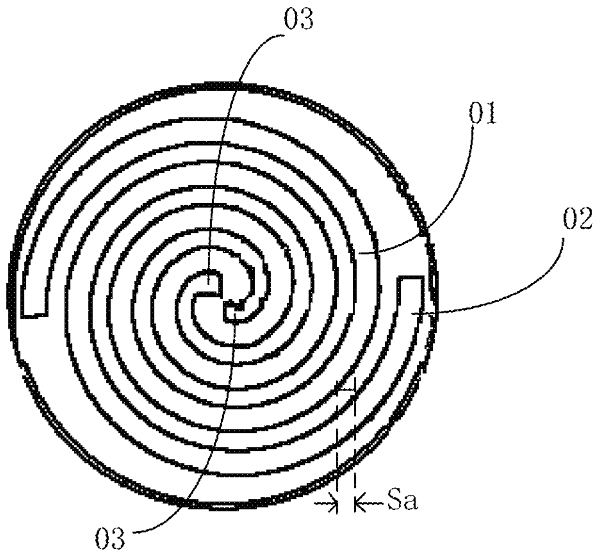
FIG. 1 is a schematic structural diagram of a planar spiral radiator according to an embodiment of the present disclosure.

When the spiral radiator 2 is a planar spiral radiator, and the orthographic projection image thereof on the metal plate 1 is approximately circular, the structure of the spiral radiator 2 is shown in FIG. 1. The circular planar spiral radiator includes a first radiation arm 01 and a second radiation arm 02, and each of the first radiation arm 01 and the second radiation arm 02 is provided with a feed position 03. The distances Sa between any two spirals of the planar spiral radiator 2 may be equal or not. Optionally, the distances Sa between any two spirals of the planar spiral radiator 2 are equal, so that the planar spiral radiator 2 shows a higher antenna efficiency.

Figure 2:
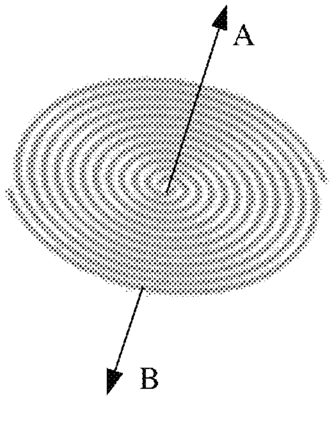
FIG. 2 shows the directions of the maximum radiation of a planar spiral radiator according to an embodiment of the present disclosure.

It can be understood that, as shown in FIG. 2, the directions of the maximum radiation of the circular planar spiral radiator 2 are the directions at the two ends perpendicular to the normal direction of the spiral plane (indicated by arrows A and B in FIG. 2). Since the planar spiral radiator 2 has a symmetrical gradient structure, and electricity properties of the spiral radiator 2 such as the pattern, antenna gain, and input impedance have little change within a relatively wide frequency range, broadband coverage can be easily realized. Therefore, design problems such as multi-frequency band and large bandwidth are effectively resolved. In addition, circular polarization is realized and any polarized incoming waves could be received to reduce the disconnection probability, so as to guarantee the stability of wireless communication.

In addition, the spiral radiator 2 is integrated on the metal plate 1, which reduces the space of the terminal occupied by the antenna structure. According to the embodiments of the present disclosure, the following problem in the related art is resolved: In order to realize multi-frequency band, large bandwidth, and high gain, millimeter-wave antennas are disposed in a terminal, which goes against the miniaturization and overall integration design because they occupy too much space.

Optionally, the planar spiral radiator 2 may be a part of the metal plate 1, that is, a part of the metal plate 1 is processed into a planar spiral structure, which constitutes the radiator. When a part of the metal plate 1 is used as the spiral radiator 2, the antenna bandwidth can be increased, and multi-frequency band coverage is realized. Furthermore, when the metal plate 1 is used as a part of a metal shell of a mobile terminal, a part of the metal shell is used as the spiral radiator 2. In this way, the space occupied by the antenna is reduced without affecting the metal texture of the terminal.

In some embodiments, an insulating medium piece is disposed between the spiral radiator 2 and the metal plate 1. That is, the accommodating groove 3 is filled with the insulating medium piece, and the spiral radiator 2 is fixed on the insulating medium piece. Furthermore, the spiral radiator 2 is fixed in the insulating medium piece or on the surface thereof. The insulating medium piece may be made of the low-dielectric-constant and low-loss dielectric material.

Figure 6:
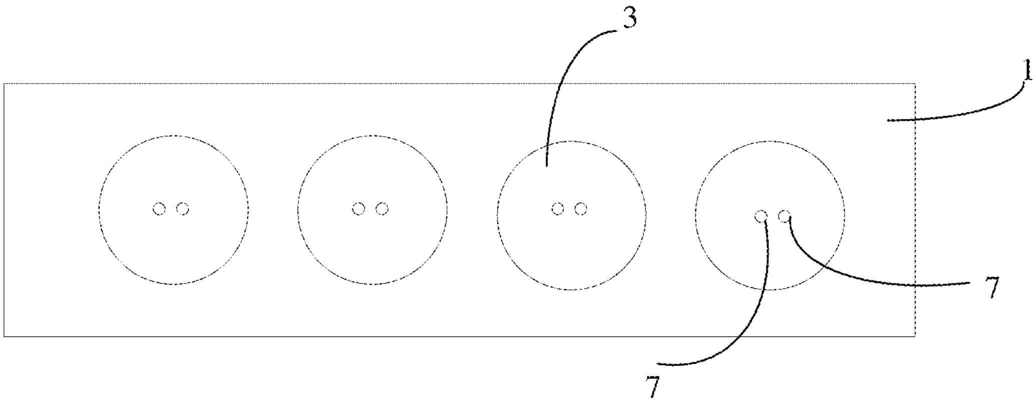
FIG. 6 is a schematic diagram of a structure in which feed holes are formed in each accommodating groove according to an embodiment of the present disclosure.
Figure 10:
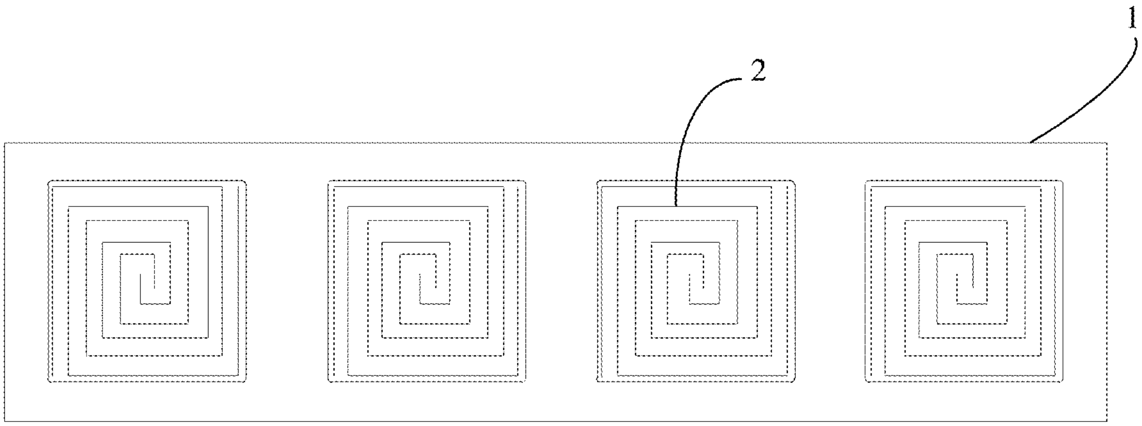
FIG. 10 is another schematic structural diagram of the antenna structure according to an embodiment of the present disclosure.

As shown in FIG. 5 and FIG. 6, there are a plurality of accommodating grooves 3, the accommodating grooves 3 are spaced apart from each other, there are a plurality of spiral radiators 2 corresponding to the accommodating grooves 3, and the spiral radiators 2 are mounted in the accommodating grooves 3 in a one-to-one correspondence manner, as shown in FIG. 5 and FIG. 10. As each spiral radiator 2 is mounted in the corresponding accommodating groove 3, the spiral radiators 2 are spaced apart from each other, so that the degree of isolation between the radiators is increased, and the coupling of the spiral radiators 2 is reduced.

Figure 3:
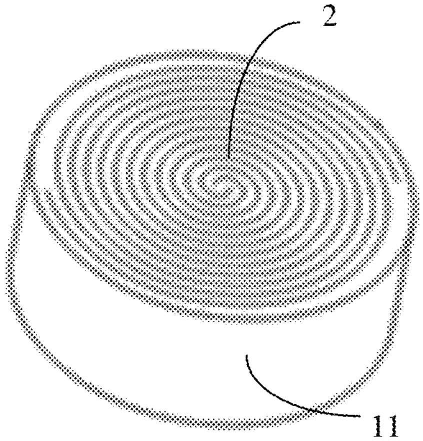
FIG. 3 is a schematic structural diagram of an accommodating groove that is used as a reflector of a planar spiral radiator according to an embodiment of the present disclosure.
Figure 4:
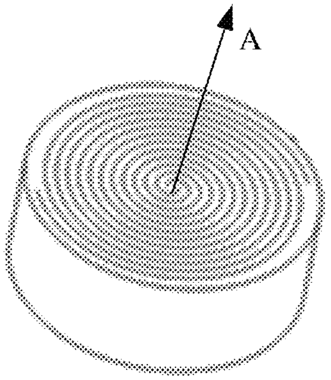
FIG. 4 shows a direction of the maximum radiation of a planar spiral radiator with a reflector according to an embodiment of the present disclosure.

Optionally, the depth of the accommodating grooves 3 is less than or equal to the thickness of the metal plate 1. That is, the accommodating grooves 3 may penetrate or not penetrate the metal plate 1. When the depth of the accommodating grooves 3 is less than the thickness of the metal plate 1, that is, when the accommodating grooves 3 are formed in the metal plate 1 but do not penetrate the metal plate 1, the accommodating grooves 3 can be used as reflectors 11 of the spiral radiators 2 when being grounded (that is, the metal plate 1 is grounded), as shown in FIG. 3. It can be learned from the comparison of FIG. 2 and FIG. 4 that when the spiral radiators 2 are provided with the reflectors 11, the direction of the maximum radiation is the upward direction (indicated by the arrow A in FIG. 4) perpendicular to the spiral plane, that is, the direction perpendicular to the spiral plane and away from the reflectors 11.

It should be noted that when a part of the metal plate 1 is used as the reflectors 11 of the spiral radiators 2, if the antenna structure in this embodiment of the present disclosure is mounted on the terminal, the spiral radiators 2 may be less sensitive to the environment inside the system behind the metal plate 1. Therefore, more components can be integrated and more functions can be realized, thereby improving the competitiveness of the terminal.

An embodiment of the present disclosure further provides a terminal, where the terminal includes:

an antenna structure, where the antenna structure is the antenna structure provided in the foregoing embodiment; and a radio frequency module, where the radio frequency module is located on the second surface of the metal plate 1, and the radio frequency module is electrically connected to or coupled with the feed ends of the spiral radiators 2. The radio frequency module is used to provide radio frequency signals, and when the radio frequency module is electrically connected to or coupled with the feed ends of the spiral radiators 2, the radio frequency module can transmit output radio frequency signals to the spiral radiators 2. It can be understood that the radio frequency module may alternatively be disposed in the system of the terminal.

The depth of the accommodating grooves 3 formed in the metal plate 1 is less than or equal to the thickness of the metal plate 1. That is, the accommodating grooves 3 may or may not penetrate the metal plate 1. When the depth of the accommodating grooves 3 is less than the thickness of the metal plate 1, that is, when the accommodating grooves 3 are formed in the metal plate 1 but do not penetrate the metal plate 1, the accommodating grooves 3 can be used as the reflectors 11 of the spiral radiators 2, as shown in FIG. 3. It can be learned from the comparison of FIG. 2 and FIG. 4 that after the spiral radiators 2 are provided with the reflectors 11, the direction of the maximum radiation is the upward direction (indicated by the arrow A in FIG. 4) perpendicular to the spiral plane. That is, the direction of the maximum radiation is the direction perpendicular to the spiral plane and away from the reflectors 11.

It can be seen that when the metal plate 1 is grounded, the accommodating grooves 3 can be used as the reflectors 11 of the spiral radiators 2. In this way, the spiral radiators 2 may be less sensitive to the environment inside the system behind the metal plate 1. Therefore, more components can be integrated and more functions can be realized, thereby improving the competitiveness of the terminal.

Figure 7:
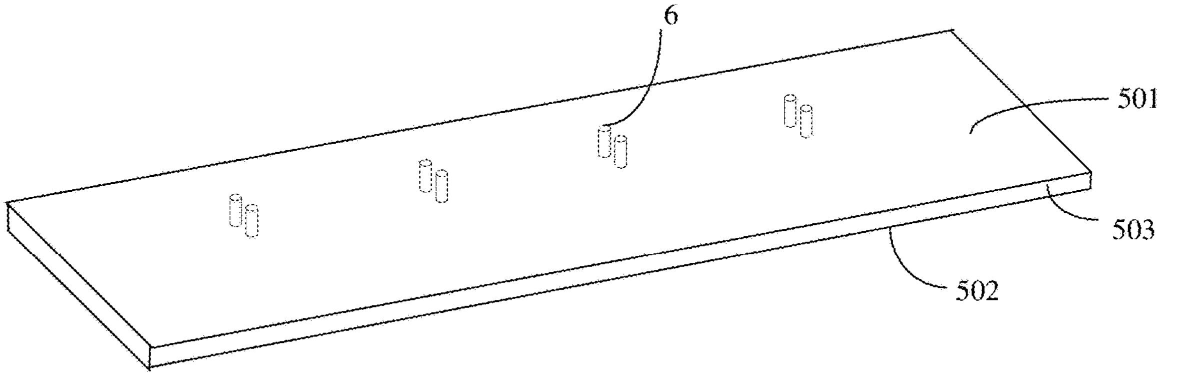
FIG. 7 is a schematic diagram of a structure in which feed pins are disposed on a radio frequency module according to an embodiment of the present disclosure.

Optionally, as shown in FIG. 7, the radio frequency module is provided with feed pins 6, and each of the feed pins 6 is electrically connected to the corresponding feed end. Furthermore, each accommodating groove 3 is provided with feed holes 7, and each of the feed pins 6 passes through the corresponding feed hole 7 to be electrically connected to the corresponding feed end. For details about the location of feed holes 7, see FIG. 6. The radio frequency module is tightly attached to the metal plate 1, so that each of the feed pins 6 can pass through the corresponding feed hole 7 to be fed into the corresponding spiral radiator 2. In this way, the signal path is the shortest path, and the path loss is effectively reduced, thereby improving the quality of wireless communication.

Optionally, when the depth of the accommodating grooves 3 is equal to the thickness of the metal plate 1 (that is, the accommodating grooves 3 are formed in the metal plate 1 and penetrate the metal plate 1), and an insulating medium piece is disposed between the spiral radiator 2 and the metal plate 1, each of the feed holes is formed in the insulating medium piece in the corresponding accommodating groove 3. When the depth of the accommodating grooves 3 is less than the thickness of the metal plate 1 (that is, the accommodating grooves 3 are formed in the metal plate 1 but do not penetrate the metal plate 1), and an insulating medium piece is disposed between the spiral radiator 2 and the metal plate 1, each of the feed holes includes a first feed hole in the bottom of the corresponding accommodating groove 3 and a second feed hole in the corresponding insulating medium piece, and each of the feed pins 6 passes through the corresponding first feed hole and the corresponding second feed hole in sequence to be electrically connected to the corresponding spiral radiator 2.

If the insulating medium pieces are formed in the accommodating grooves 3 via injection molding of the insulating material, each feed hole is formed in the corresponding insulating medium piece because the feed pins are in the accommodating grooves 3 during injection molding.

Optionally, the accommodating grooves 3 are spaced apart from each other, the spiral radiators 2 are mounted in the accommodating grooves 3 in a one-to-one correspondence manner, and the distance between every two adjacent spiral radiators 2 is equal to half of the wavelength of the operating frequency of the antenna structure.

The spiral radiators 2 form an array antenna, which can lead to multi-frequency band coverage. In addition, during the beam scanning, performance of the array antenna formed by the spiral radiators 2 may be the same or similar in a spatial symmetrical or mapping direction. In addition, the distance between every two adjacent spiral radiators 2 is equal to half of the wavelength of the operating frequency of the antenna structure. Optionally, when the spiral radiators 2 are disposed at intervals on the metal plate 1 in the length direction thereof, the interval is the distance between every two adjacent spiral radiators 2 in the length direction of the metal plate 1. When the spiral radiators 2 are disposed at an interval on the metal plate 1 in the width direction thereof, the interval is the distance between every two adjacent spiral radiators 2 in the width direction of the metal plate 1.

Optionally, the radio frequency module includes a radio frequency integrated circuit 504 and a power management integrated circuit 505, and the radio frequency integrated circuit 504 is electrically connected to the feed ends and the power management integrated circuit 505. The radio frequency module may also be provided with a BTB connector 506 used for intermediate-frequency signal connection between the radio frequency module and the main board of the terminal.

Figure 8:
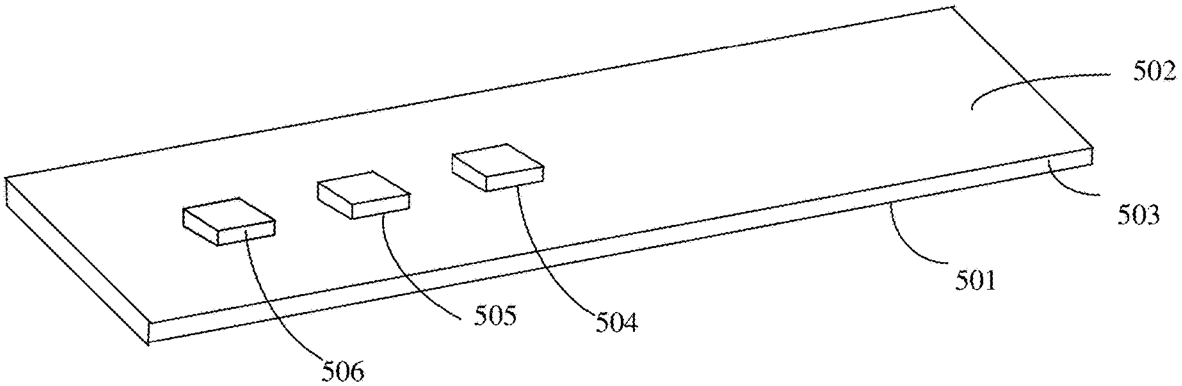
FIG. 8 is a schematic diagram of disposing of a radio frequency integrated circuit and a power management integrated circuit on a radio frequency module according to an embodiment of the present disclosure.

Furthermore, as shown in FIG. 8, the radio frequency module further includes a first ground layer 501, a second ground layer 502, and an insulating medium layer 503. The insulating medium layer 503 is located between the first ground layer 501 and the second ground layer 502. The radio frequency integrated circuit 504 and the power management integrated circuit 505 are disposed on the second ground layer 502. The radio frequency integrated circuit 504 is electrically connected to the feed ends of the spiral radiators 2 via a first wire, the radio frequency integrated circuit 504 is electrically connected to the power management integrated circuit 505 via a second wire, and the first wire and the second wire are distributed in the insulating medium layer 503. The radio frequency integrated circuit 504 is disposed on the ground layer of the radio frequency module, which can greatly reduce path loss of antenna signals.

It should be noted that when the radio frequency module is disposed on the side, facing the inner part of the terminal, of the metal plate 1, the first ground layer 501 of the radio frequency module can be used as the reflectors of the spiral radiators 2.

In addition, as shown in FIG. 7, when the radio frequency module is electrically connected to the feed ends of the spiral radiators 2 via the feed pins, the feed pins are disposed on the first ground layer 501. Optionally, the feed pins are located in the insulating medium layer 503 and are electrically connected to the radio frequency integrated circuit on the second ground layer 502 via the wire in the insulating medium layer 503. The first via holes are formed in the first ground layer 501, and the diameter of the first via holes is greater than that of the feed pins, that is, each of the feed pins is located in the corresponding first via hole, but not in contact with the first ground layer 501.

Figure 9:
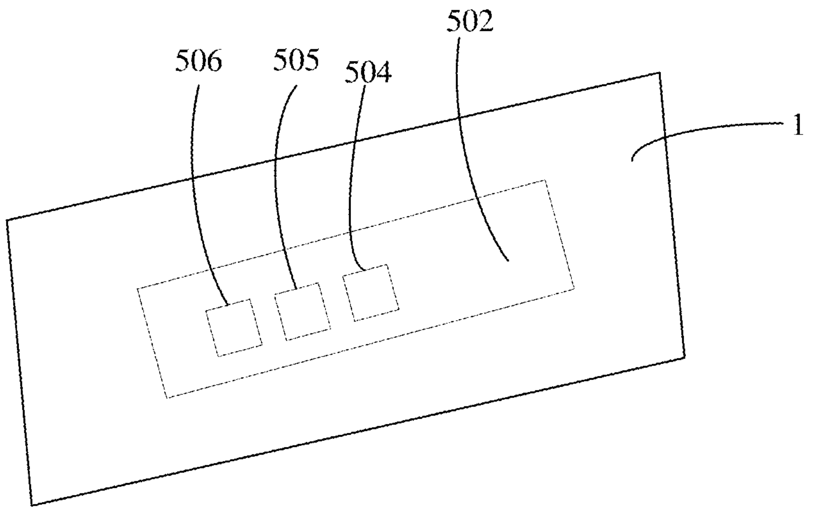
FIG. 9 is a schematic diagram of assembly of a radio frequency module and a metal frame according to an embodiment of the present disclosure.

It can be learned from the above that, the radio frequency module shown in FIG. 8 is disposed on the second surface of the metal plate 1, so that each of the feed pins passes through the corresponding feed hole in the corresponding accommodating groove 3 to be electrically connected to the corresponding spiral radiator 2. For the mounting effect of the radio frequency module shown in FIG. 8 on the metal plate 1 shown in FIG. 6, see FIG. 9.

Figure 11:
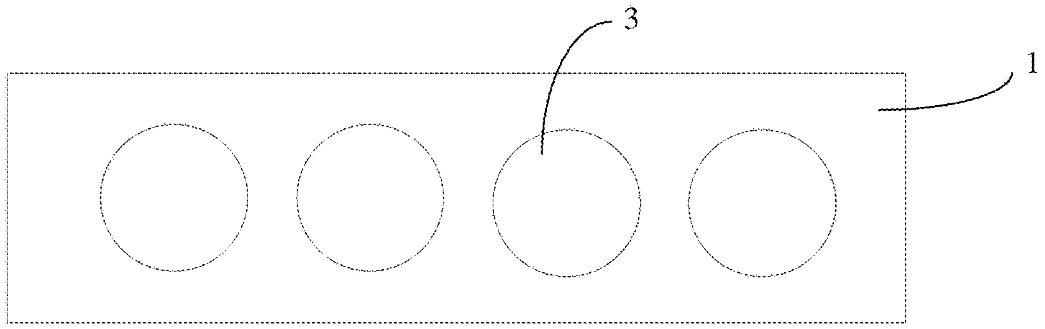
FIG. 11 is a schematic diagram of a structure in which accommodating grooves are formed in a metal plate according to an embodiment of the present disclosure.
Figure 12:
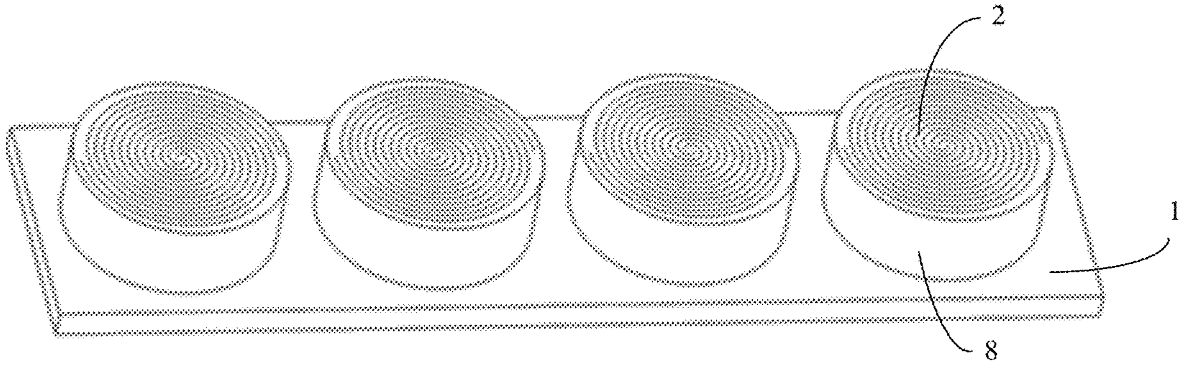
FIG. 12 is a schematic diagram of a structure in which spiral radiators are fixed on a radio frequency module according to an embodiment of the present disclosure.
Figure 13:
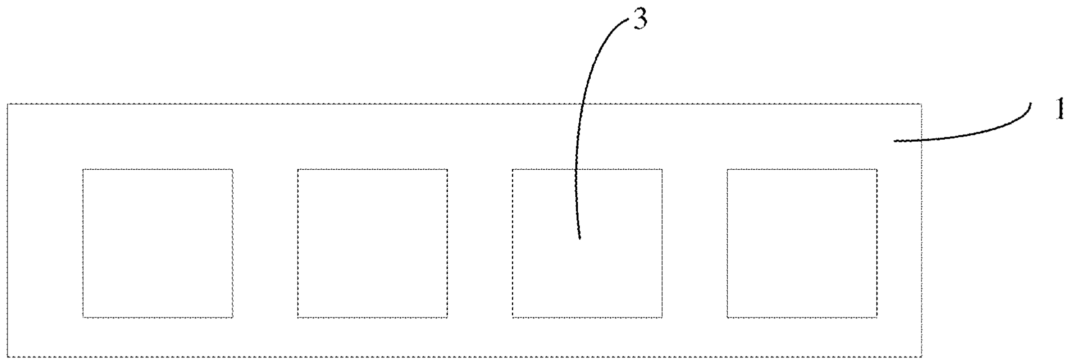
FIG. 13 is another schematic diagram of the structure in which the accommodating grooves are formed in the metal plate according to an embodiment of the present disclosure.
Figure 14:
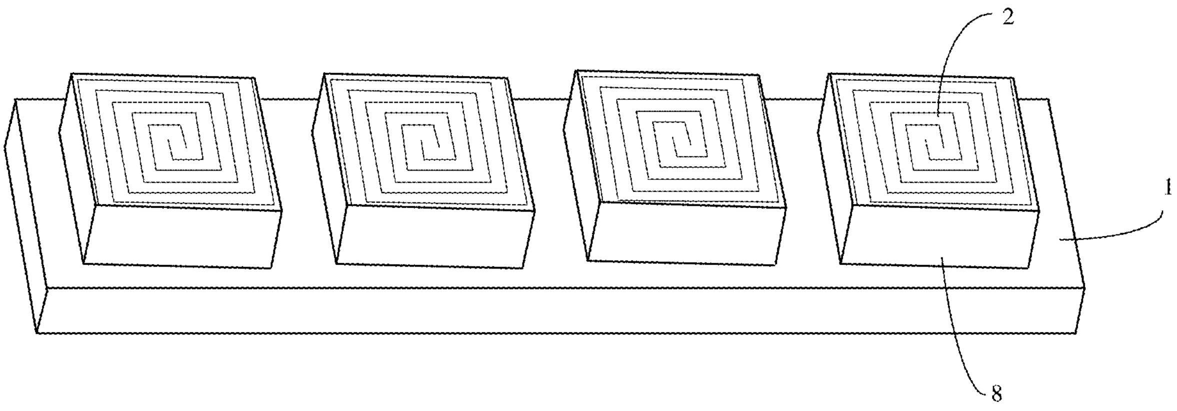
FIG. 14 is another schematic diagram of the structure in which spiral radiators are fixed on a radio frequency module according to an embodiment of the present disclosure.

Alternatively, the spiral radiators 2 may be disposed on the radio frequency module, as shown in FIG. 12 and FIG. 14, a plurality of insulating components 8 are disposed at an interval on the first ground layer 501 of the radio frequency module, each of the spiral radiators 2 is fixed on the corresponding insulating component 8, and the accommodating grooves 3 are formed in the metal frame and penetrate the metal frame (as shown in FIG. 11 and FIG. 13), so that each of the insulating components 8 is embedded in the corresponding accommodating groove 3. That is, in the foregoing solution, each spiral radiator 2 in the corresponding accommodating groove 3 and the corresponding insulating medium piece 4 are integrated on the radio frequency module as a protruding part, and a corresponding hole is formed in the metal plate 1, so that each of the protruding parts on the radio frequency module is embedded in the corresponding hole, to achieve the purpose of positioning and position limitation.

Optionally, when the orthographic projection images of the spiral radiators 2 on the metal plate 1 are approximately circular, the accommodating grooves 3 are circular, and the insulating components 8 on the first ground layer 501 of the radio frequency module are circular, as shown in FIG. 11 and FIG. 12. When the orthographic projection images of the spiral radiators 2 on the metal plate 1 are approximately square, the accommodating grooves 3 are square, and the insulating components 8 on the first ground layer 501 of the radio frequency module are square, as shown in FIG. 13 and FIG. 14.

Figure 15:
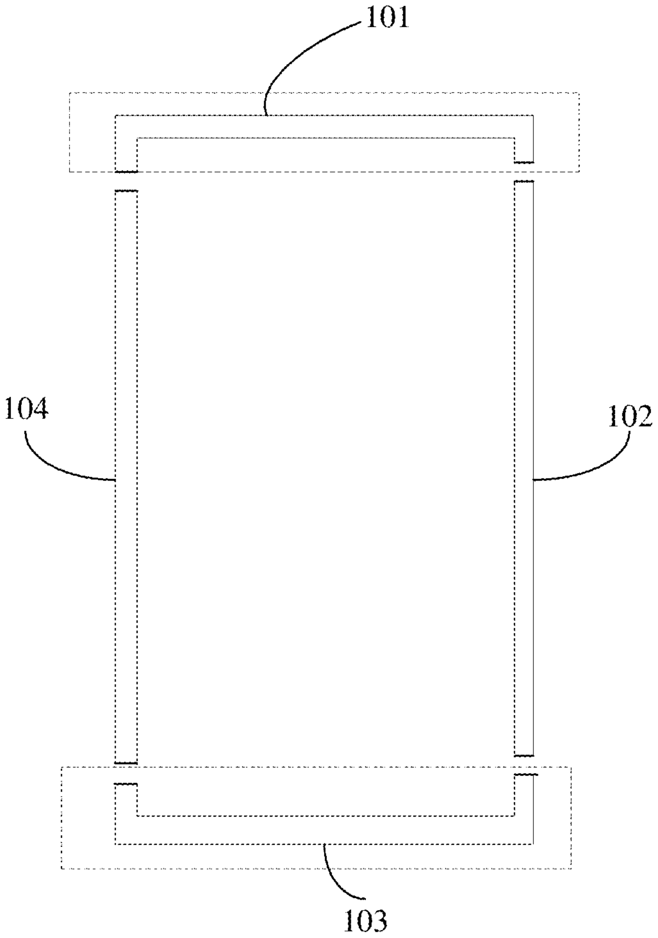
FIG. 15 is a schematic diagram of disposing of an antenna structure on a terminal according to an embodiment of the present disclosure.

Optionally, the terminal is provided with a shell, at least a part of the shell is a metal shell, and the metal plate 1 is the first part of the metal shell. For example, as shown in FIG. 15, the metal shell includes a first frame 101, a second frame 102, a third frame 103, a fourth frame 104, and a metal middle shell. A system ground is surrounded by the first frame 101, the second frame 102, the third frame 103, and the fourth frame 104. The system ground may be a PCB board, a metal middle frame, an iron frame on the screen, and/or the like. The spiral radiators 2 can be integrated on the metal frame at the parts circled by the dashed line boxes in FIG. 15.

That is, the spiral radiators 2 are integrated on the metal shell of the terminal, which reduces the space of the terminal occupied by the spiral radiators 2.

It can be understood that the metal plate 1 is not limited to a part of the metal shell. Alternatively, the metal plate 1 may be a part of a target antenna radiator on the terminal, and the operating frequency band of the target antenna radiator is different from that of the spiral radiators 2. That is, the spiral radiators 2 may be integrated on the other antenna radiators on the terminal.

Optionally, the first part is the side part and/or the back part of the metal shell. When the first part is the side part of the metal shell, it can be avoided that the back part of the terminal is shielded by a metal table when the terminal is placed (with the screen facing upwards) on a metal table, and it can also be avoided that the antenna performance of the spiral radiators 2 is greatly reduced when the terminal is hold in hand.

Optionally, the radio frequency module is a millimeter-wave radio frequency module.

In view of the above, in the embodiments of the present disclosure, millimeter-wave antennas are integrated into the metal frame, a part of the metal frame is used as radiation fins of the millimeter-wave antennas, which can increase the bandwidth of the millimeter-wave antennas to cover multiple 5G millimeter-wave frequency bands without affecting the metal texture of the mobile terminal, thereby enhancing the broadband wireless experience of users in multiple millimeter-wave frequency bands when roaming across countries or even globally.

In addition, the quantities, location, shapes, dimensions, angles, distances, arrangement modes, communication frequency bands, implementations, and the like are not limited to those described in the embodiments. All other applications and designs made based on the thinking and spirit of the present disclosure shall fall within the protection scope of the present disclosure.

The foregoing descriptions are merely the optional implementations of the present disclosure. It should be noted that those of ordinary skill in the art may further make several improvements and refinements without departing from the principles described in the present disclosure, and these improvements and refinements also fall within the protection scope of the present disclosure.

What is claimed is:

1. A terminal, comprising an antenna structure and a radio frequency module, wherein the antenna structure comprises:

a metal plate, wherein the metal plate is provided with a first surface and a second surface that are disposed oppositely, an accommodating groove is formed in the metal plate and adjacent to the first surface; and a spiral radiator, wherein the spiral radiator is mounted in the accommodating groove and insulated from the metal plate, and the spiral radiator is provided with a feed end used to be connected to a feed source;

the radio frequency module is located on the second surface of the metal plate, and the radio frequency module is electrically connected to or coupled with the feed ends of the spiral radiators;

the radio frequency module comprises a first ground layer, a second ground layer and an insulating medium layer; and the insulating medium layer is located between the first ground layer and the second ground layer;

a plurality of insulating components are disposed at an interval on the first ground layer, each spiral radiator is fixed on a corresponding insulating component, and each insulating component is embedded in a corresponding accommodating groove that is formed in the metal plate and penetrate the metal plate; and the metal plate is a part of a target antenna radiator on the terminal, and an operating frequency band of the target antenna radiator is different from an operating frequency band of the spiral radiator.

2. The terminal according to claim 1, wherein the radio frequency module is provided with feed pins, and each of the feed pins is electrically connected to the corresponding feed end.

3. The terminal according to claim 2, wherein each of the accommodating grooves is provided with feed holes, and each of the feed pins passes through the corresponding feed hole to be electrically connected to the corresponding feed end.

4. The terminal according to claim 1, wherein there are a plurality of accommodating grooves, the accommodating grooves are spaced apart from each other, there are a plurality of spiral radiators corresponding to the accommodating grooves, the spiral radiators are mounted in the accommodating grooves in a one-to-one correspondence manner, and the distance between every two adjacent spiral radiators is equal to half of the wavelength of the operating frequency of the antenna structure.

5. The terminal according to claim 1, wherein the radio frequency module comprises a radio frequency integrated circuit and a power management integrated circuit, and the radio frequency integrated circuit is electrically connected to the feed ends and the power management integrated circuit.

6. The terminal according to claim 5, wherein the radio frequency integrated circuit and the power management integrated circuit are disposed on the second ground layer, the radio frequency integrated circuit is electrically connected to the feed ends of the spiral radiators via a first wire, the radio frequency integrated circuit is electrically connected to the power management integrated circuit via a second wire, and the first wire and the second wire are distributed in the insulating medium layer.

7. The terminal according to claim 1, wherein the terminal is provided with a shell, at least a part of the shell is a metal shell, and the metal plate is the first part of the metal shell.

8. The terminal according to claim 7, wherein the first part is the side part and/or the back part of the metal shell.

9. The terminal according to claim 1, wherein the radio frequency module is a millimeter-wave radio frequency module.

10. The terminal according to claim 1, wherein an insulating medium piece is disposed between the spiral radiator and the metal plate.

11. The terminal according to claim 10, wherein the spiral radiator is fixed in the insulating medium piece or on the surface of the insulating medium piece.

12. The terminal according to claim 1, wherein the spiral radiator is a planar spiral radiator.

13. The terminal according to claim 1, wherein the orthographic projection image of the spiral radiator on the metal plate is approximately round or square, and the accommodating groove fits the spiral radiator.

* * * * *